Aug. 8, 1967  J. S. JARVIS  3,334,739
DRESSING SHOES FOR GRAIN THRESHING MECHANISMS
Filed April 22, 1964  3 Sheets-Sheet 1

INVENTOR
John Stevens Jarvis
BY
Ira Milton Jones
ATTORNEY

INVENTOR
John Stevens Jarvis
BY
ATTORNEY

United States Patent Office 3,334,739
Patented Aug. 8, 1967

3,334,739
DRESSING SHOES FOR GRAIN THRESHING
MECHANISMS
John S. Jarvis, Suffolk, England, assignor to Ransomes
Sims & Jefferies, Suffolk, England
Filed Apr. 22, 1964, Ser. No. 361,676
13 Claims. (Cl. 209—19)

This application is a continuation-in-part of my co-pending application, Ser. No. 299,862, filed Aug. 5, 1963, now abandoned.

This invention relates to grain cleaning mechanisms for grain threshing machines and more particularly to grain cleaning mechanisms for use in combine harvesters.

In both stationary threshing machines and threshing machines incorporated in a combine harvester, the threshed material is conveyed from the threshing mechanism to a grain cleaning mechanism.

One known form of grain cleaning mechanism includes a "dressing shoe," which is a frame in which an upper sieve and a lower sieve are mounted so as to be reciprocable fore-and-aft and up-and-down. At the rearward end of the upper sieve there is an extension formed by a number of wires which are mounted at their forward ends only on a strip which extends horizontally transversely across the rearward end of the upper sieve. The wires form what is known as a finger grid. A fan is arranged to discharge air rearwardly and upwardly through the two sieves and the finger grid.

In use of the cleaning mechanism, the grain, chaff and weed seeds separated from the straw by the cylinder and concave are collected and are deposited onto the forward end of the upper sieve. The combined fore-and-aft and up-and-down movement of that sieve together with the air blast causes the material to move rearwardly along the sieve, the heavier grain falling through the apertures in the upper sieve onto the lower sieve, where a further separating action takes place. Grain falling through the lower sieve falls onto a forwardly and downwardly sloping tray which conveys it to a hopper compartment from which it is removed sidewardly by a screw conveyor and then conveyed to a suitable storage receptacle. The lighter constituents of the material are picked up and blown out of the machine by the air blast, but the larger, heavier constituents pass over the rearward end of the upper sieve onto the finger grid. Those parts which are not picked up and carried away by the air flow through the finger grid drop between the fingers of the grid and fall into a second or tailings hopper compartment, from which they are removed sidewardly by a second screw conveyor, for re-circulation to the threshing mechanism.

It is found that the upper sieve becomes overloaded when the grain passes onto the upper sieve at a greater rate than it is capable of falling through the openings or perforations in the sieve. This has two deleterious effects. Firstly the air from the dressing fan is incapable of passing through the thicker mass and therefore does not assist in the separation. Secondly, the upper layers of grain on the sieve are moving rearwardly along the sieve over the lower layers of grain on the sieve, so that the grain in these upper layers cannot pass through the sieve until they have travelled some distance rearwardly along the sieve.

As a result, some of the grain reaches the rear end of the upper sieve before it has had sufficient time to pass through the openings in the sieve, and this grain is lost to the ground. If the apertures in the upper sieve were made larger, to allow more grain to pass through them, there would be a corresponding decrease in the velocity of the upward air current through the openings in the sieve, permitting rubbish to fall through the openings with the grain, and resulting in a dirty grain sample in the grain hopper compartment.

To overcome this difficulty of overloading recourse has been had to the use of wider sieves, in order that the thickness of the bed on the upper sieve can be reduced while maintaining the same through-put of material through the grain cleaning mechanism.

An object of the present invention is the provision of an improved grain cleaning mechanism capable of an increased through-put of material without an increase in the width of the upper sieve.

The present invention consists in a grain cleaning mechanism for a grain threshing machine, comprising a dressing shoe which includes a sieve and mounting means which allow fore-and-aft oscillatory movement of the sieve, wherein the sieve includes a forward section and a rearward section, a forward end of the rearward section being disposed rearwardly of a rearward end of the forward section to provide a horizontally extending gap therebetween, and an air discharge means is arranged to discharge air upwardly and rearwardly through the dressing shoe, the oscillatory movement of the shoe together with the flow of air through openings in the forward and rearward sections of the sieve tending to separate grain from lighter material, and the flow of air through the gap between the two sections allowing grain separated from lighter material in passage over the forward section to fall through the gap whilst causing the lighter material to pass over the gap to the rearward section.

The invention will now be described, by way of example, with reference to the accompanying drawings, in which.

Figure 1:
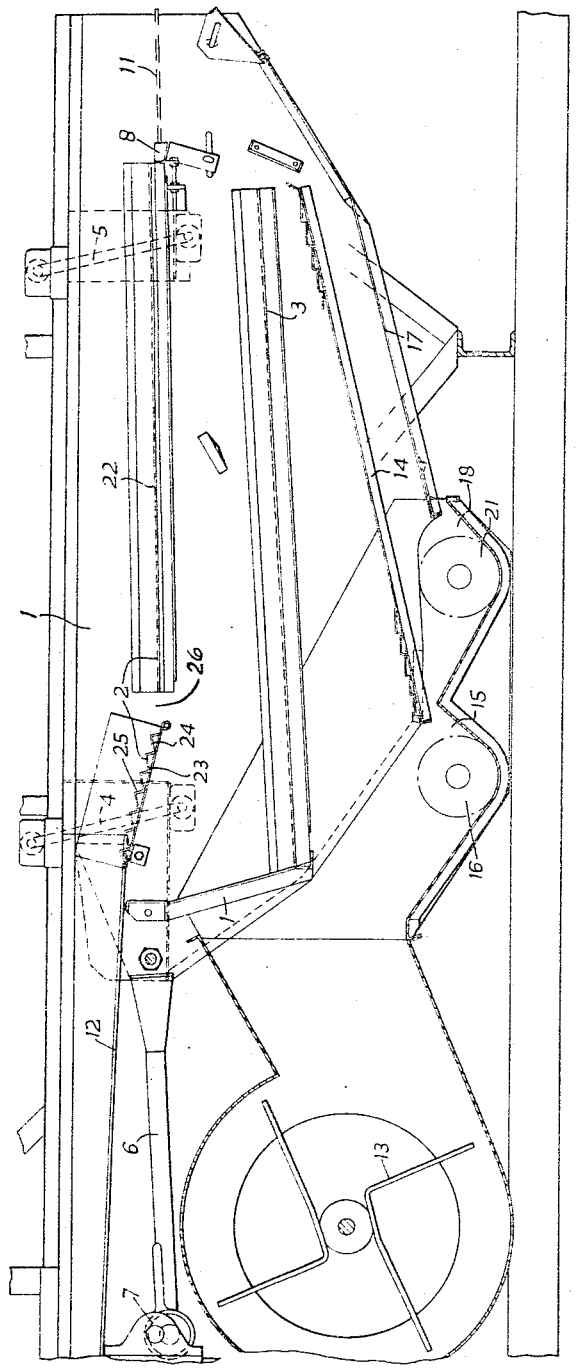
FIGURE 1 is a side elevation of a grain cleaning mechanism according to the invention.

In the grain cleaning mechanism illustrated in FIGURE 1 of the drawings there is provided a dressing shoe 1 consisting of a frame having upper and lower sieves 2 and 3 respectively, mounted thereon. The dressing shoe 1 is suspended from the frame of a grain threshing machine by two front suspender arms 4, which are arranged with their pivots co-axial near the forward end of the shoe, and two somewhat longer rear suspender arms 5, arranged with their pivots co-axial near the rearward end of the shoe. The suspender arms 4 and 5 are pivoted on the frame of the machine so that the shoe can swing in a fore-and-aft direction, and the shoe is coupled by a connecting rod 6 to the driven member of a power driven eccentric mechanism 7. By arrangement of the suspender arms relative to the dressing shoe an up-and-down movement is also imparted to the complete assembly.

A wooden bar 8 is clamped to the rearward end of the upper sieve 2 so as to extend transversely across the sieve and a multiplicity of wires are each securely mounted in the bar, at their forward ends only, to form a finger grid 11. For supplying grain to the upper sieve 2 a grain tray 12 is mounted on the frame near to the forward end of the sieve or, alternatively, other conveying means such as a chain and slat conveyor can be employed.

A fan 13 is mounted at the forward end of the grain cleaning mechanism and is arranged to discharge air upwardly and rearwardly through the sieves 2 and 3 and the finger grid 11.

Below the lower sieve 3 is a forwardly and downwardly sloping tray 14 which collects grain falling through the sieve and conveys it to a hopper compartment 15, from which it is removed sidewardly by a screw conveyor 16, and then conveyed to a storage chamber. A second tray 17 is provided for collecting material which drops between the wires of the finger grid 11 and conveying it to a second, or "tailings," hopper compartment 18, from which it is removed sidewardly by a second screw conveyor 21 for recirculation to the threshing mechanism.

As shown in FIGURE 1 the upper sieve 2 is made up of two sections, a forward section 23 which extends downwardly and rearwardly from the rearward end of grain tray 12 and a rearward section 22 which is substantially horizontally disposed. A forward end of rearward section 22 is disposed rearwardly of a rearward end of forward section 23 so as to provide a horizontally extending gap 26 between the two sections. The rearward section 22 is disposed at the same vertical location as the rearward end of forward section 23.

Figure 2:
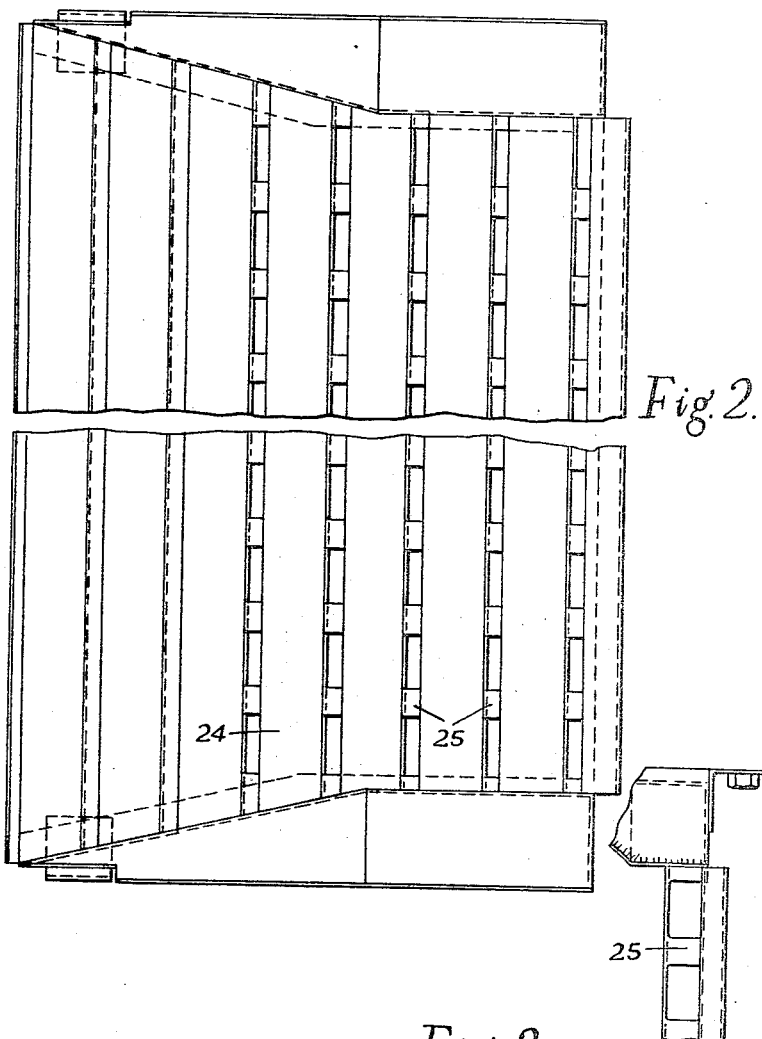
FIGURE 2 is a plan view of the forward section of an upper sieve of the mechanism of FIGURE 1.
Figure 3:
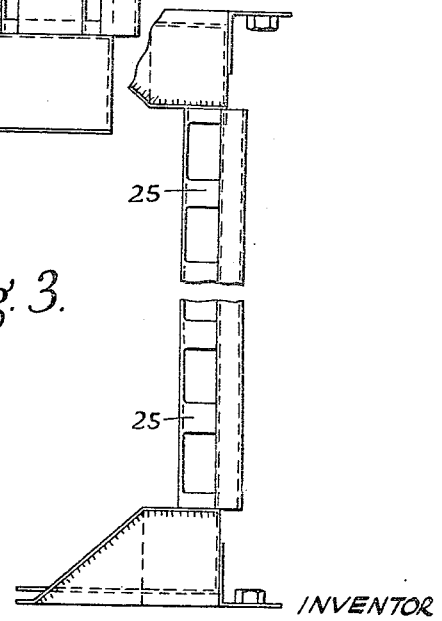
FIGURE 3 is an end view of the forward sieve section shown in FIGURE 2.

As shown in FIGURES 2 and 3 the forward section 23 of the upper sieve 2 includes seven planes or "treads" 24, each inclined upwardly and rearwardly and each provided with air discharging openings through which air can flow upwardly and through which grain can fall downwardly on to the lower sieve. 3. The openings in the forward section 23 can be made of fixed size and larger than the openings normally provided in the rearward section 22, and when it is required to separate lighter grains and seeds only the openings in the rearward section need be adjusted in size. Spacers or "risers" 25 are provided between the inclined planes 24, the lower five risers being perforated to provide air discharge openings through which air can flow from the fan 13 rearwardly through material falling from the tread above that riser to the tread below that riser.

The rearward section 22 of the upper sieve can be of any orthodox construction but, as indicated in FIGURE 1, the width of the openings in this section, and the horizontal component of each opening in the forward section 23, is less than the width of the horizontally extending gap 26 between the two sieve sections.

In use of the machine grain, chaff and rubbish separated from straw by the threshing mechanism of the machine are collected on the grain tray 12 and are then deposited on the forward end of the forward section 23 of the upper sieve 2. The combined fore-and-aft and up-and-down movement of the upper sieve, together with the air blast from the fan, causes the material to move rearwardly across the forward section 23 towards the rearward end thereof.

It will be appreciated that two conflicting requirements are involved in selecting the size of the openings in a sieve of a grain cleaning mechanism.

On the one hand the openings should be as large as possible so that grain can easily fall through the sieve. On the other hand the larger the openings the lower is the resistance which the sieve offers to the flow of air from the fan, resulting in a smaller pressure differential across the sieve, a low velocity of air flow through the sieve, and a danger of lighter material such as chaff and rubbish falling through the section with the heavier grain instead of being urged upwardly by the flow of air.

The openings in the forward section 23 of the upper sieve are so arranged that with the machine operating under normal conditions air from the fan is able to flow upwardly and rearwardly at a sufficient rate to pass through the openings and through the material on the section, thereby tending to lift the chaff and rubbish from the grain. Moreover, the openings are such that the bottom layers of grain are then caught and pass through the openings to the lower sieve. A proportion of the material is therefore separated in this manner before it reaches the rearward end of the forward section.

In conventional cleaning mechanisms the amount of air to be provided always proves to be a problem when separating light grain from chaff and rubbish as although sufficient air is always required to keep the material sufficiently airborne for good separation, the danger exists that some of the grain will be blown away. However, in the cleaning mechanism according to the present invention the forward section is at a considerable distance from the air discharge point at the rearward end of the mechanism and accordingly the grain has sufficient time to fall out from the air on to the rearward section. As a result sufficient air can be supplied from the fan to the forward section to give efficient grain separation without excessive loss of light grain in the air discharge from the mechanism.

When the machine is operating at high grain throughputs the openings in the forward section 23 are such that the air blast from the fan, although not capable of lifting chaff completely from the grain, does tend to separate the thicker mass into two layers, there being a gradual movement of chaff and lighter material to the top of the mass of material.

The gap 26 between the forward and rearward sections of the upper sieve is, of course, wider than the openings in the forward section itself. Accordingly, as soon as material reaches the rearward end of the forward section the bottom layer of grain falls immediately through the horizontally extending gap between the two sections, approximately 80% of the grain travelling straight to the lower sieve in this manner.

Moreover, immediately to the rear of the gap is the rearward section of the upper sieve, which provides considerable resistance to the upward and rearward flow of air from the fan. This causes a build up in air pressure below the rearward section of the upper sieve, which effectively acts as a plenum chamber for the supply of air through the gap. In spite of its width there is, therefore, a relatively high rate of flow through the gap and this is sufficient to carry the upper layers of chaff across the gap to the rearward section.

Grain which does not fall through the openings in the forward section or the longitudinally extending gap to the lower sieve passes onto the rearward section, moving rearwardly along this section due to the combination of its up-and-down and fore-and-aft movement and the action of the air blast as it passes through the sieve. Grain which drops through the apertures in the rearward section also lands on the lower sieve whilst the larger, heavier constituents pass on to the finger grid.

A further separation takes place on the lower sieve, the grain which falls through this sieve being collected by the tray 14 and conveyed to the compartment 15 from which it is removed by the screw conveyor 16. Grain which falls between the wires of the finger grid is likewise collected by the second tray, conveyed to the tailings hopper compartment, and removed from thereby the second screw conveyor.

As an alternative to a series of steps with openings therebetween the forward section 23 may comprise a perforated plate or a series of louvres or slat which can be in an adjustable form, or a so-called "Graepel" sieve may be employed.

Figure 4:
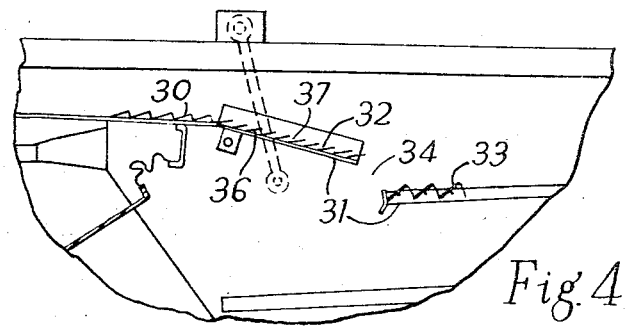
FIGURE 4 is a diagrammatic side elevation of part of a second grain cleaning mechanism according to the invention.

Moreover, the rearward section of the upper sieve can be disposed at a vertical location below the vertical location of the rearward end of the forward section. FIGURE 4 of the drawings shows an upper sieve of a further grain cleaning mechanism according to the invention in which the sieve sections are arranged in this manner.

In the mechanism of FIGURE 4 an upper sieve 31 comprises a forward section 32 which extends at an inclination downwardly and rearwardly from a grain tray 30 and a substantially horizontally disposed rearward section 33. A forward end of the rearward section 33 is disposed rearwardly of, and below, a rearward end of the forward section 32 so as to provide a gap 34 between the two sections which has both a horizontal and a vertical component.

As indicated in FIGURE 4 the forward section 32 comprises a series of upwardly and rearwardly inclined louvres or slats 36 so arranged as to provide a series of rearwardly facing openings 37 which extend across the full width of the sieve section. Air from a dressing fan can be discharged upward and rearwardly through these openings 37 and through material as it bounces down the section from one slat 36 to another.

The rearward section 33 of the sieve illustrated in FIGURE 4 is also formed of a series of louvres.

It will be appreciated that the forward sieve section of this embodiment can be replaced by a sieve formed of a perforated plate, or by a series of "treads" and "risers," or by a so-called "Graepel" grid.

Furthermore, it will be appreciated that a grain cleaning mechanism according to the invention may include a forward sieve section which is horizontally disposed rather than downwardly and rearwardly inclined as in the embodiments illustrated in FIGURES 1 to 4.

Figure 5:
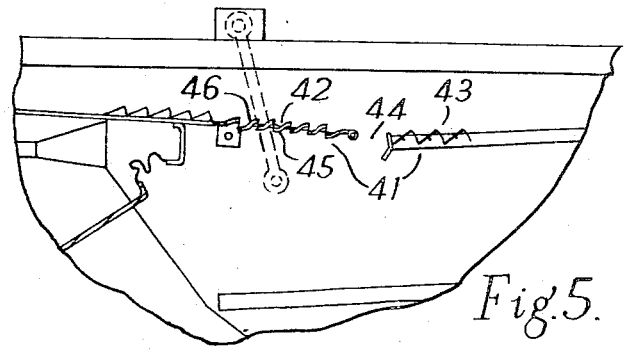
FIGURE 5 is a diagrammatic side elevation of part of a third grain cleaning mechanism according to the invention.

Thus, in the part of a mechanism which is illustrated in FIGURE 5 an upper sieve 41 is made up of forward and rearward sections 42 and 43, respectively, which are both horizontally disposed and arranged at the same vertical location. The rearward section 43 is disposed with a forward end thereof rearwardly of a rearward end of the forward section 42 so as to provide a horizontal extending gap 44 between the two sections.

Figure 6:
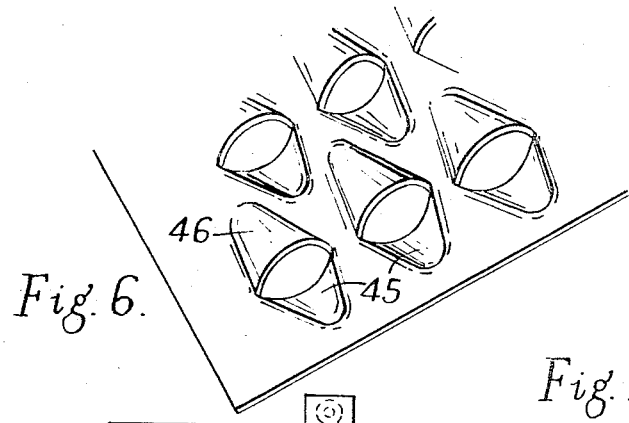
FIGURE 6 is a fragmentary perspective view of a sieve section included in FIGURE 5.

As indicated in FIGURES 5 and 6 the forward section 42 is a so-called "Graepel" grid. This consists of a flat plate formed with a series of slits which extend transversely of the flow of material over the plate, the portion 45 of the plate adjacent to and rearwardly of each slit being bent downwardly out of the plane of the plate and the portion 46 adjacent to and forwardly of the slit being bent upwardly out of the plane of the plate.

Figure 7:
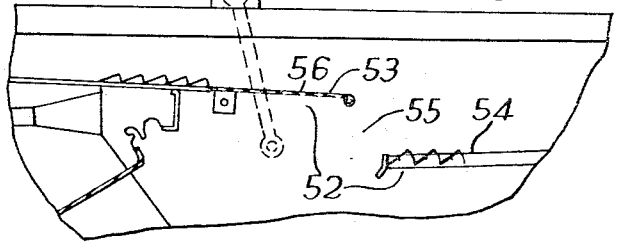
FIGURE 7 is a diagrammatic side elevation of part of a fourth grain cleaning mechanism according to the invention.

In the mechanism of FIGURE 7 an upper sieve 52 is made up of two sections, a forward section 53 and a rearward section 54, both of which are substantially horizontally disposed. The forward section 53 extends rearwardly from a rearward end of a grain tray and the rearward section 54 has its forward end disposed rearwardly of a rearward end of the forward section so as to provide a horizontally extending gap 55 between the two sections. The forward section 53 is disposed at a vertical location above that of the rearward section 54.

As indicated in FIGURE 7 the rearward section 54 is formed of adjustable louvres whilst the forward section 53 comprises a substantially flat plate having perforations 56 formed therein. The width of these perforations 56 is less than the width of the horizontally extending gap 55 between the two sieve sections.

It will be appreciated that the forward sieve section of a cleaning mechanism having its two sieve sections arranged in the manner illustrated in FIGURE 5 may comprise a perforated plate, a series of "treads" and "risers" or a series of louvres or slats which may be adjustable. Similarly, the forward sieve section of the embodiment illustrated FIGURE 7 can be replaced by a so-called "Graepel" sieve, a series of "treads" and "risers," or a series of louvres or slats which may be adjustable.

Apart from the construction of the forward and rearward sections of the upper sieve and the arrangement of the sections relative to one another the grain cleaning mechanisms parts of which are respectively illustrated in FIGURES 4, 5 and 7 are the same as that described above with reference to FIGURE 1. The operation of these mechanisms is likewise the same.

I claim:

1. A grain cleaning mechanism for a threshing machine by which grain is separated from chaff, comprising:
   (A) a fore-and-aft extending forward sieve section mounted for oscillatory fore-and-aft motion and having its front end communicated with feed means from which material to be separated can move onto said forward sieve section;
   (B) a fore-and-aft extending rearward sieve section mounted for oscillatory fore-and-aft motion, the front end of said rearward sieve section being at all times spaced rearwardly from the rear end of the forward sieve section to define a horizontally extending gap between said sections, and the front end of the rearward sieve section being at a horizontal level which is not substantially higher than that of the rear end of the forward sieve section;
   (C) drive means for imparting fore-and-aft oscillatory motion to both of said sieve sections to cause material on them to move rearwardly;
   (D) air propulsion means for generating a stream of moving air; and
   (E) air directing means cooperating with said air propulsion means and said sieve sections to direct moving air upwardly through both of said sieve sections and said gap, so that air flowing through the openings in the forward sieve section tends to raise lighter material to a level above that of the grain moving over the forward sieve section, while air flowing upwardly through said gap tends to carry lighter material across said gap and onto the rearward sieve section while the heavier grain falls downwardly through said gap.

2. A grain cleaning mechanism as claimed in claim 1, in which the rearward sieve section is disposed with its forward end at the same horizontal level as the rearward end of the forward sieve section.

3. A grain cleaning mechanism as claimed in claim 2, in which the forward sieve section slopes downwardly and rearwardly towards the rearward sieve section.

4. A grain cleaning mechanism as claimed in claim 2, in which the forward and rearward sieve sections are substantially horizontally disposed.

5. A grain cleaning mechanism as claimed in claim 1, in which the rearward sieve section is disposed with its forward end at a horizontal level below that of the rearward end of the forward sieve section so that the gap between the forward and rearward sieve sections extends vertically as well as horizontally.

6. A grain cleaning mechanism as claimed in claim 5, in which the forward sieve section slopes downwardly and rearwardly towards the rearward sieve section.

7. A grain cleaning mechanism as claimed in claim 5, in which the forward and rearward sieve sections are substantially horizontally disposed.

8. A grain cleaning mechanism as claimed in claim 1, in which the forward sieve section includes a plurality of rearwardly and upwardly inclined surfaces, there being rearwardly facing openings between the inclined surfaces.

9. A grain cleaning mechanism as claimed in claim 8, in which the forward sieve section includes a plurality of risers, each rearwardly and upwardly inclined surface being connected to the following surface by means of a riser and at least one riser having apertures formed therein.

10. A grain cleaning mechanism as claimed in claim 8, in which the forward sieve section includes a plurality of louvres which slope upwardly and rearwardly.

11. A grain cleaning mechanism as claimed in claim 1, in which the forward sieve section comprises a substantially flat plate having a large number of perforations formed therein.

12. A grain cleaning mechanism as claimed in claim 11, in which the forward sieve section comprises a substantially flat plate formed with a large number of slits each of which extends transversely of the flow of material over the plate, the portion of the plate adjacent to and rearwardly of each slit being bent downwardly out of the plane of the plate and the portion adjacent to and forwardly of the slit being bent upwardly out of the plane of the plate.

13. A grain cleaning mechanism as claimed in claim 1 in which the apertures in the forward sieve section are so small as to prevent passage therethrough of more than a substantially small amount of grain.

References Cited

UNITED STATES PATENTS

| | | | |
|---|---|---|---|
| 23,641 | 4/1859 | Fitts | 209—26 X |
| 358,834 | 3/1887 | Carter | 209—27 |
| 584,777 | 6/1897 | Gutenkunst | 209—397 X |
| 2,554,416 | 5/1951 | Morrissey | 209—26 X |
| 2,670,845 | 3/1954 | Busack | 209—26 |

FOREIGN PATENTS 772,345   8/1934   France.

FRANK W. LUTTER, *Primary Examiner.*